(12) United States Patent
 Canatella

(10) Patent No.: US 10,100,940 B2
(45) Date of Patent: Oct. 16, 2018

(54) ONE-WAY VALVE DEVICES

(71) Applicant: Terumo Cardiovascular Systems Corporation, Ann Arbor, MI (US)

(72) Inventor: Timothy John Canatella, Jarrettsville, MD (US)

(73) Assignee: Terumo Cardiovascular Systems Corporation, Ann Arbor, MI (US)

( * ) Notice: Subject to any disclaimer, the term of this patent is extended or adjusted under 35 U.S.C. 154(b) by 0 days.

(21) Appl. No.: 15/181,991

(22) Filed: Jun. 14, 2016

(65) Prior Publication Data
US 2017/0356556 A1    Dec. 14, 2017

(51) Int. Cl.
| | |
|---|---|
| *F16K 15/04* | (2006.01) |
| *F16K 15/14* | (2006.01) |
| *F16L 55/07* | (2006.01) |
| *F16K 27/02* | (2006.01) |

(52) U.S. Cl.
CPC ............ *F16K 15/04* (2013.01); *F16K 15/147* (2013.01); *F16K 27/0245* (2013.01); *F16L 55/07* (2013.01); *Y10T 137/6109* (2015.04)

(58) Field of Classification Search
CPC .......... F16K 15/14; F16K 15/04; F16K 15/06; F16K 15/02; F16K 27/0245; F16K 15/147; Y10T 137/6109
USPC ........................................ 137/533.11, 533.19
See application file for complete search history.

(56) References Cited

U.S. PATENT DOCUMENTS

| | | | |
|---|---|---|---|
| 1,461,439 A | | 7/1923 | Burgin |
| 1,555,934 A | | 10/1925 | Barker |
| 1,777,539 A | | 10/1930 | Yerkes |
| 1,861,674 A | | 6/1932 | Winterhoff |
| 1,901,217 A | | 3/1933 | Yerkes et al. |
| 2,294,568 A | | 9/1942 | Neilsen |
| 2,379,421 A | | 7/1945 | Brooke |
| 2,578,069 A | | 12/1951 | Jones |
| 2,682,281 A | | 6/1954 | Ecker |
| 3,059,667 A | | 10/1962 | Coceano |
| 3,710,942 A | * | 1/1973 | Rosenberg .............. A61M 5/00 137/846 |
| 4,071,042 A | | 1/1978 | Lombard et al. |
| 4,100,935 A | | 7/1978 | Harnish |
| 5,095,940 A | | 3/1992 | Saur et al. |
| 5,348,048 A | * | 9/1994 | Schirado .............. B67D 1/1256 137/588 |
| 5,593,292 A | | 1/1997 | Ivey |
| 5,653,258 A | | 8/1997 | Schwarz |
| 5,785,083 A | | 7/1998 | Tang |
| 5,924,452 A | * | 7/1999 | Szpara et al. ......... A61M 39/24 137/844 |
| 6,044,859 A | * | 4/2000 | Davis .................... A61M 39/24 137/15.19 |
| 6,382,255 B2 | * | 5/2002 | McFarland .......... F16K 15/147 137/849 |
| 6,508,269 B2 | | 1/2003 | Szabo et al. |
| 6,824,117 B2 | * | 11/2004 | Horton ................. F16K 15/147 137/846 |

(Continued)

*Primary Examiner* — Kevin Lee
(74) *Attorney, Agent, or Firm* — Fish & Richardson P.C.

(57) ABSTRACT

One-way valve devices can be used within fluid systems. For example, this document provides one-way valves that can be installed within a lumen of a tube, a fitting, and other types of tubular members. In some embodiments, the one-way valve includes a unitary frame and a ball member that is loosely constrained within the confines of the frame.

13 Claims, 5 Drawing Sheets

(56) References Cited

U.S. PATENT DOCUMENTS

2006/0201557 A1 9/2006 Shieh
2015/0362086 A1 12/2015 Christensen et al.

* cited by examiner

ONE-WAY VALVE DEVICES

BACKGROUND

1. Technical Field

This document relates to one-way valve devices. For example, this document relates to one-way valves that can be installed within a lumen of a tube, a fitting, and other types of tubular members.

2. Background Information

Fluid systems commonly include components such as tubing, pumps, reservoirs, heat exchangers, sensors, filters, valves, and the like. Such components can be connected together in a network to define a fluid flow path. Some fluid systems are open systems, meaning that the fluid flows through the network once and then exits the network. Other fluid systems are closed systems, meaning that the fluid recirculates within the network of components. Fluids are caused to flow in the fluid system using fluid pressure differentials. In some cases, a pump is used to create a pressure differential that causes the fluid to flow within the fluid system. In some cases, a vacuum source is used to create a pressure differential that causes the fluid to flow within the fluid system. In some cases, gravity is used to create a pressure differential that causes the fluid to flow within the fluid system. In some cases, a combination of such techniques is used to create a pressure differential that causes the fluid to flow within the fluid system.

In some cases, it is desirable to control the direction of flow of fluids flowing through a fluid system. For example, in some cases it may be desirable to allow fluids to flow in a first direction, but to restrict the fluids from flowing in a direction opposite to the first direction.

SUMMARY

This document provides one-way valve devices. For example, this document provides one-way valves that can be installed within a lumen of a tube, a fitting, and other types of tubular members.

In one aspect, the disclosure is directed to a one-way valve device that includes a frame and a spherical ball. The frame includes a base that defines an opening and a seat. The frame also includes a plurality of elongate ball containment members that extend from the base. Each ball containment member of the plurality of ball containment members has a free end that is opposite of the base. The frame is a unitary, monolithic construct. The ball is loosely disposed within and contained within a space defined between the plurality of ball containment members and the base. The ball can make contact with the seat to create a fluid seal therebetween. The one-way valve device does not have its own housing and is configured to be inserted within the lumen of a tube.

Such a one-way valve device may optionally include one or more of the following features. The base may include one or more annular ribs that are configured to engage with an inner wall of the tube. The frame may be a unitary molded thermoplastic component. The one-way valve may be sterile and contained within packaging that maintains sterility. The one-way valve device may also include an insertion tool contained within the packaging. The insertion tool may include a insertion tool base and a plurality of fingers extending from the insertion tool base. Free ends of the plurality of fingers may be configured for contacting the base of the one-way valve and for applying a force thereto for inserting the one-way valve within the tube.

In another aspect, the disclosure is directed to a one-way valve device including a valve body and a lumen longitudinally therethrough, and a duckbill member at least partially disposed within the lumen of the valve body. The valve body includes a sleeve portion on one end of the valve body. The sleeve portion is configured for engaging within a lumen of a first tube. The valve body also includes an annular rib for engaging with an inner wall of a second tube when the one-way valve is installed within a lumen of the second tube. The second tube can be installed over an end portion of the first tube while the one-way valve is within the lumen of the second tube and the sleeve portion is engaged within the lumen of the first tube. The duckbill member is reconfigurable between an open configuration and a closed configuration. In some embodiments, the duckbill member is a flexible elastomer.

Particular embodiments of the subject matter described in this document can be implemented to realize one or more of the following advantages. In some embodiments, the one-way valves provided herein can be conveniently installed within the lumen of a tube, a fitting, and other types of tubular members. That is, the one-way valves provided herein do not need a dedicated housing of its own. Accordingly, a tube (or an overall fluid system) can be equipped with a one-way flow property without the need for an additional fitting as conventionally required. By eliminating the additional fitting normally necessary for a one-way valve, potential leak sources are eliminated, the length of fluid system can be reduced, the cost to assemble the fluid system are reduced, and so on. Moreover, an existing tubular fluid component can be readily converted to have a one-way operation by inserting a one-way valve as provided herein.

Another advantage is provided by the fact that in some embodiments the one-way valves provided herein are assembled from only two component pieces. The first piece is a unitary, monolithic frame that includes a base, a seat, and ball containment members. The second piece is a ball that slidingly fits within the confines of the ball containment members. The ball can be snapped into an interior space defined by the ball containment members and the base. Accordingly, the one-way valves provided herein are economical to manufacture. In some cases, an economical insertion tool can also be provided along with the one-way valves provided herein.

Unless otherwise defined, all technical and scientific terms used herein have the same meaning as commonly understood by one of ordinary skill in the art to which this invention pertains. Although methods and materials similar or equivalent to those described herein can be used to practice the invention, suitable methods and materials are described herein. All publications, patent applications, patents, and other references mentioned herein are incorporated by reference in their entirety. In case of conflict, the present specification, including definitions, will control. In addition, the materials, methods, and examples are illustrative only and not intended to be limiting.

The details of one or more embodiments of the invention are set forth in the accompanying drawings and the description herein. Other features, objects, and advantages of the invention will be apparent from the description and drawings, and from the claims.

DESCRIPTION OF THE DRAWINGS

Like reference numbers represent corresponding parts throughout.

DETAILED DESCRIPTION

This document provides one-way valve devices. For example, this document provides one-way valves that can be installed within a lumen of a tube, a fitting, and other types of tubular members.

Figure 1:
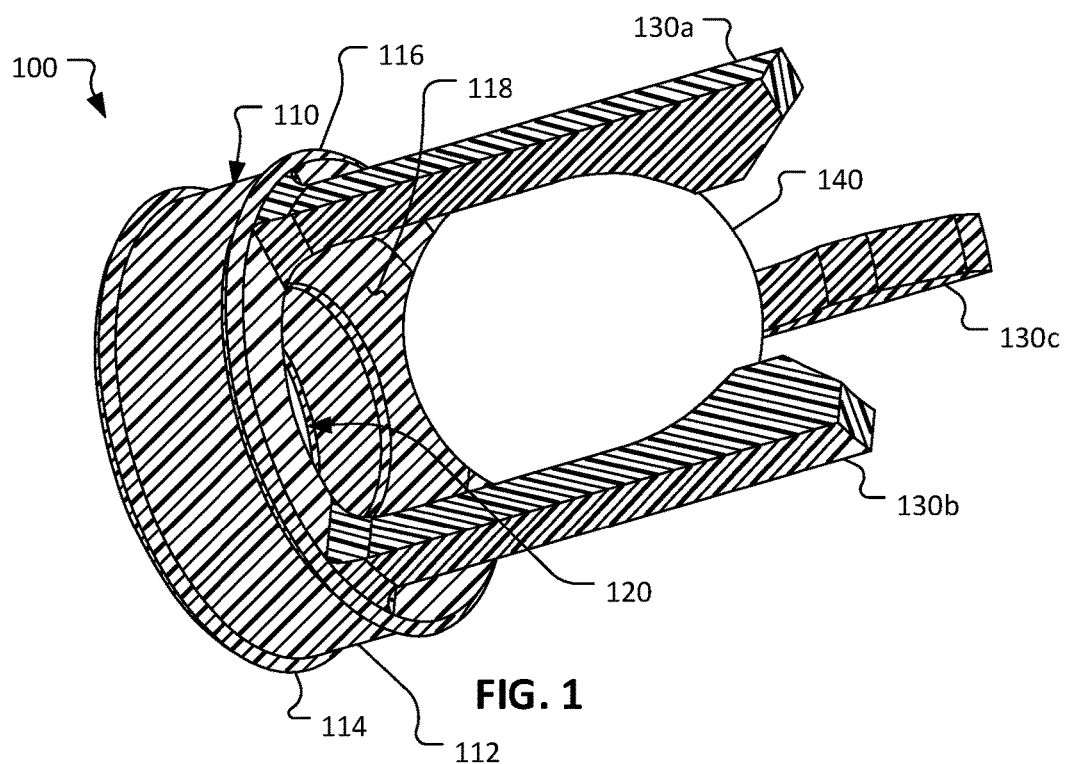
FIG. 1 is a perspective view of an example one-way valve in accordance with some embodiments provided herein.
Figure 2:
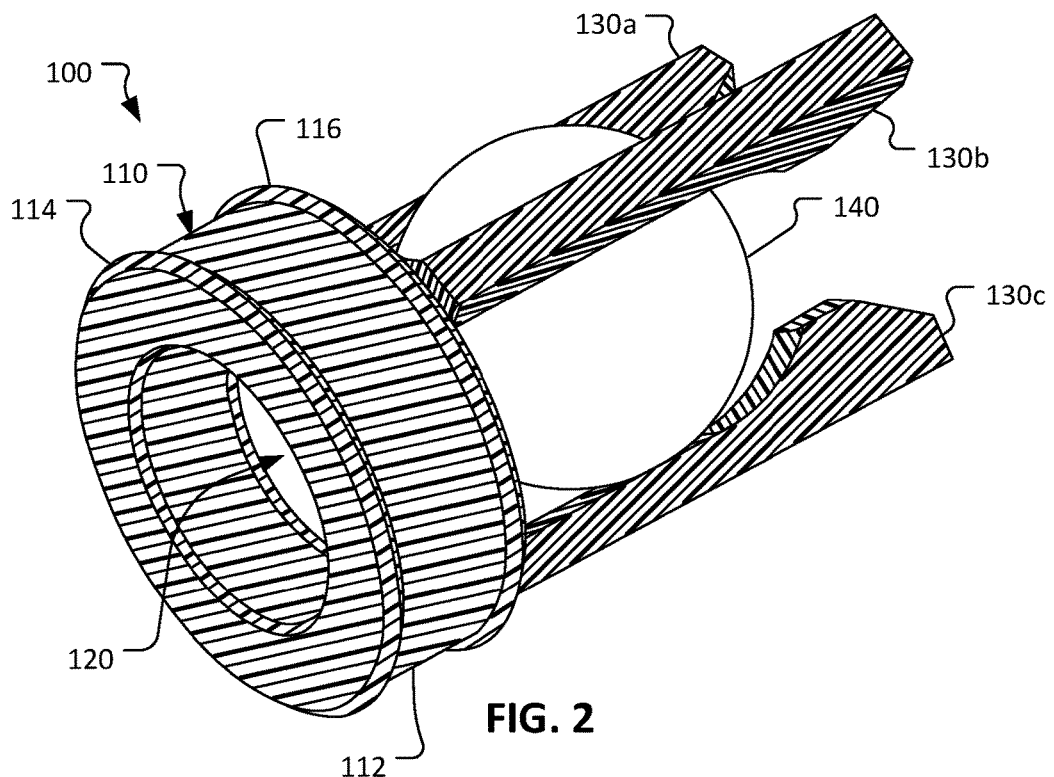
FIG. 2 is another perspective view of the one-way valve of FIG. 1.

Referring to FIGS. 1 and 2, an example one-way valve 100 includes a frame 110 and a ball 140. The ball 140 is contained within the frame 110, but is free to move along the longitudinal axis of the frame 110.

As described further below, the depicted one-way valve 100 does not include its own housing or coupling(s). Rather, the one-way valve 100 is configured for insertion and containment within the lumen of a tube, a fitting, and other types of tubular members of a fluid system.

The frame 110 includes a base 112 and three ball containment members 130a, 130b, and 130c. The three ball containment members 130a, 130b, and 130c are elongate members that extend longitudinally from the base 112 and define a space in which the ball 140 is movably disposed.

In some embodiments, the frame 110 is a unitary construct. That is, the base 112 and the three ball containment members 130a, 130b, and 130c can be molded in a unitary fashion from a thermoplastic. Thermoplastics such as, but not limited to, polycarbonate, silicone, polyvinyl chloride (PVC), polyethylene (PE), fluoropolymers (e.g., PTFE, PVDA, PFA, and FEP), and the like, and combinations thereof, can be used to construct the frame 110. Hence, no assembly is required with respect to the frame 110 since it can be a unitary, monolithic construct.

The base 112 defines an opening 120 through which fluid can flow when the one-way valve 100 is configured to allow fluid flow. The base 112 includes a seat 118 that is sized and shaped complementary with the ball 140. Hence, while the ball 140 is in contact with the seat 118, a fluid seal is created therebetween. In some embodiments, the base 112 includes one or more annular ribs 114 and 116. Each of the annular ribs 114 and 116 can include one or more pointed edges for mechanically engaging with an inner wall of a tube, as described further below.

The three ball containment members 130a, 130b, and 130c can be oriented at about 120° apart from each other around the base 112. The axes of the three ball containment members 130a, 130b, and 130c are generally parallel to each other. In some embodiments, more than three ball containment members are included. The three ball members 130a, 130b, and 130c include free ends that are opposite from the base 112.

The three ball containment members 130a, 130b, and 130c are configured such that there is clearance between the three ball containment members 130a, 130b, and 130c and the ball 140. Accordingly, the ball 140 is free to move longitudinally between the base 112 and an end-most position where the three ball containment members 130a, 130b, and 130c stop the longitudinal movement of the ball 140.

The ball 140 is spherical in the depicted embodiment. The ball 140 can be made from polymeric, ceramic, natural, or metallic materials.

Figure 3:
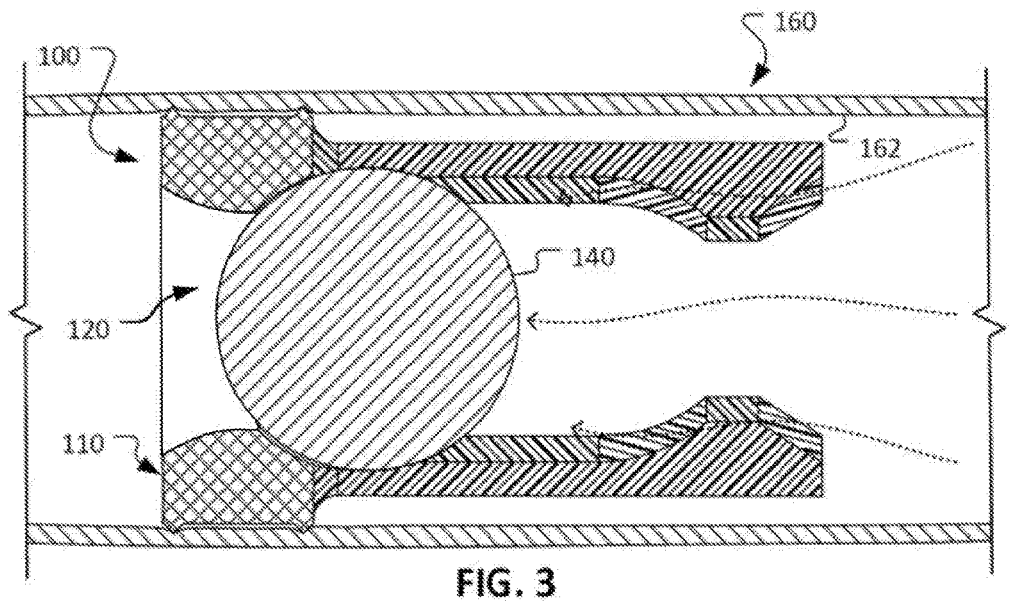
FIG. 3 is a cross-sectional view of the one-way valve of FIG. 1 installed in a tube and in a configuration whereby the valve prevents back-flow.

Referring also to FIG. 3, the one-way valve 100 is shown installed in a tube 160, and in a configuration whereby fluid is prevented from flowing through the tube 160. In this configuration, the ball 140 is in contact with the seat 118 of the base 112 such that there is a fluid seal therebetween.

FIG. 3 shows how the one-way valve 100 can be disposed within, and operate within, a tubular member such as the tube 160. A frictional fit between the base 112 and the inner wall 162 of the tube 160 can be used to restrain the one-way valve 100 in a desired position within the tube 160. In some cases, the one or more annular ribs 114 and 116 indent into the inner wall 162 to engage with the inner wall 162 of the tube 160. In some cases, the one or more annular ribs 114 and 116 deflect because of contact with the inner wall 162. In any such case, the one-way valve 100 is mechanically restrained within the tube 160.

The tube 160 can be a flexible tube, a rigid tube, or a semi-rigid tube. In some cases, the tube 160 is a literal portion of a tube. In some cases, the tube 160 is a portion of a component used within a fluid system. For example, the tube 160 can be a portion of a fitting, a pump inlet tube or outlet tube, a reservoir inlet or outlet, a heat exchanger inlet or outlet, and the like.

The one-way valve 100 can be installed within the tube 160 in either direction (i.e., as shown or in a reverse orientation).

Figure 4:
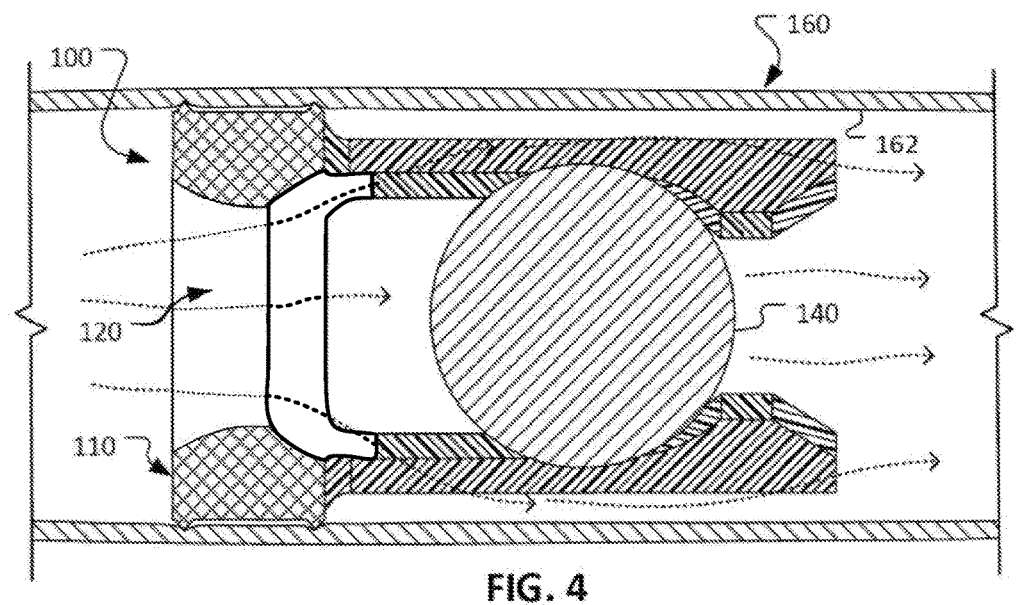
FIG. 4 is a cross-sectional view of the one-way valve of FIG. 1 installed in a tube and in a configuration whereby the valve allows forward-flow.

Referring also to FIG. 4, the one-way valve 100 is shown in a configuration whereby fluid is allowed to flow through the tube 160. In this configuration, the ball 140 is out of contact with the seat 118 of the base 112.

The forces from the fluid flow through the tube 160 can cause the ball 140 to move within the confines of the frame 110. For example, FIG. 3 shows how fluid flowing in the direction from the free ends of the three ball containment members 130a, 130b, and 130c toward the base 112 can push the ball 140 into contact with the seat 118 (to thereby stop fluid flow). FIG. 4 shows how fluid flowing in the direction from the base 112 toward the free ends of the three ball containment members 130a, 130b, and 130c can push the ball 140 into away from contact with the seat 118 (to thereby open a fluid flow path through the tube 160).

Figure 5:
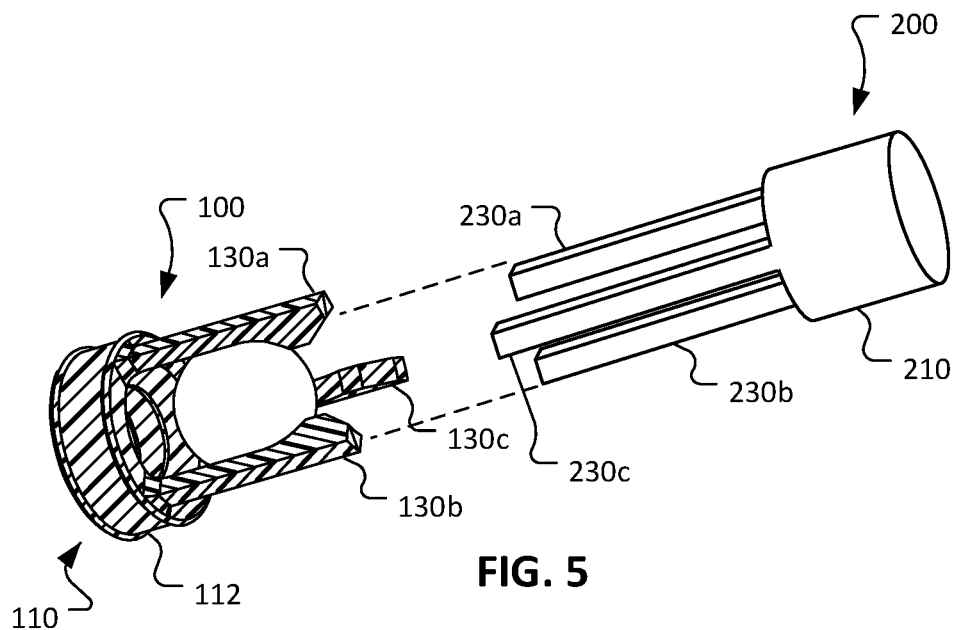
FIG. 5 is an exploded perspective view of the one-way valve of FIG. 1 and an insertion tool in accordance with some embodiments.
Figure 6:
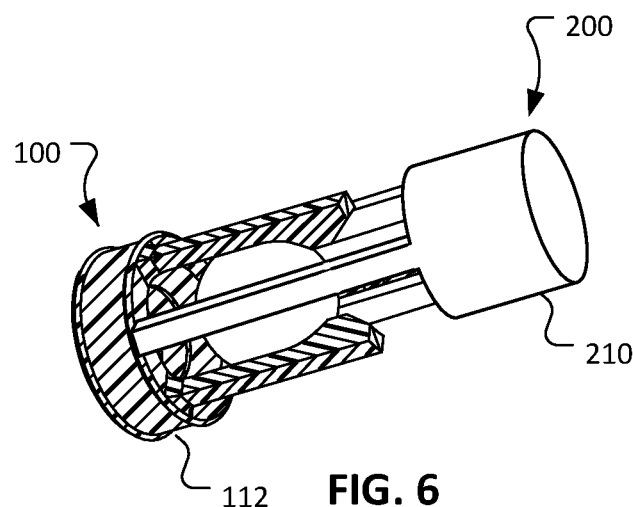
FIG. 6 is a perspective view of the one-way valve of FIG. 1 in a coupled arrangement with the insertion tool of FIG. 5.
Figure 7:
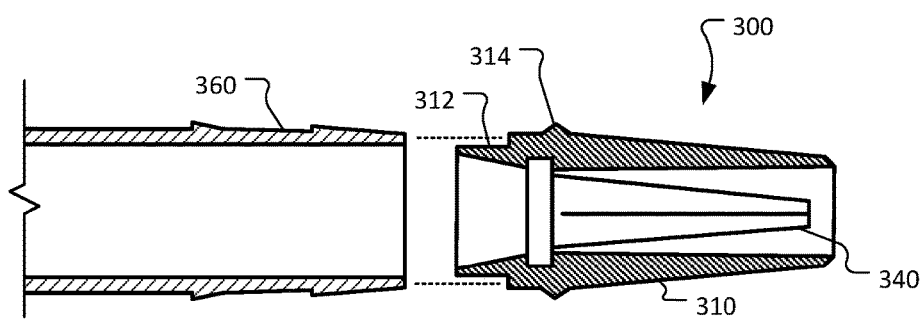
FIG. 7 is an exploded longitudinal cross-sectional view of another example one-way valve and end portion of a first tube in accordance with some embodiments.
Figure 8:
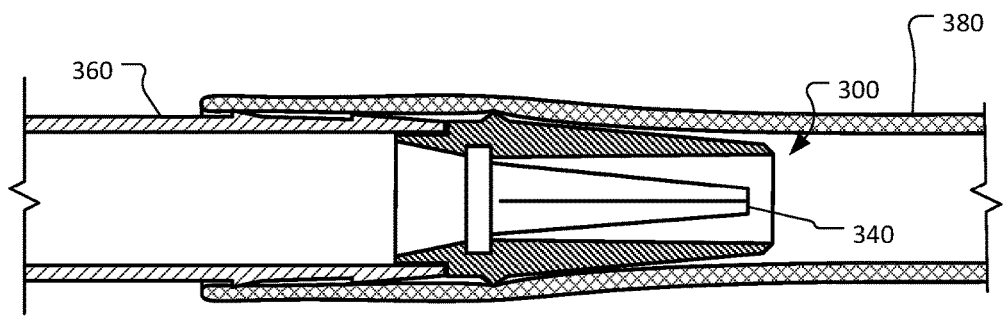
FIG. 8 is a longitudinal cross-sectional view of the one-way valve of FIG. 7 engaged with the end portion of the first tube. A second tube is engaged over both the one-way valve and the end portion of the first tube.

Referring to FIGS. 5 and 6, an insertion tool 200 can be used to place the one-way valve 100 into the lumen of a tube or tubular portion of a device. The insertion tool 200 has a base 210 and three finger members 230a, 230b, and 230c that extend from the base 210.

While the insertion tool 200 is in engagement with the one-way valve 100 (as depicted in FIG. 6), each of the three finger members 230a, 230b, and 230c extend between adjacent ball containment members of the three ball containment members 130a, 130b, and 130c. In that manner, the free ends of the three finger members 230a, 230b, and 230c can contact the base 112 (without contacting the three ball containment members 130a, 130b, and 130c). Accordingly, a user can grasp the base 210 of the insertion tool 200 and use it to push the one-way valve 100 into a tube with the base 112 of the one-way valve 100 leading the way.

Alternatively, the insertion tool 200 can be used in the opposite orientation with respect to the one-way valve 100. That is, the base 210 of the insertion tool 200 can be pressed against the base 112 of the one-way valve 100. In that manner, a user can push the one-way valve 100 into a tube with the free ends of the three ball containment members 130a, 130b, and 130c leading the way.

In some cases, the one-way valve 100 is a sterile component that is provided in sterile packaging. In some cases, the one-way valve 100 and the insertion tool 200 are each sterile components that are packaged either together in a common sterile package, or in separate sterile packages.

Referring to FIGS. 7-10, another example one-way valve 300 can be used at the juncture of two tubular members, i.e., a tube 360 and a tube 380 in this example. In the depicted example, the tube 380 is a flexible tube that is installed over a barbed tube 360. The one-way valve 300 couples with the end of the barbed tube 360 and then the tube 380 is installed over the one-way valve 300 and over an end portion of the barbed tube 360.

The one-way valve 300 could be configured with a ball and ball containment members as described above in reference to the one-way valve 100, but in this case the one-way valve 300 is a duckbill valve.

The one-way valve 300 includes a valve body 310 and a duckbill member 340. The duckbill member 340 is disposed within a lumen defined by the valve body 310. The valve body can be configured with various structural features for engaging with tubes. In the depicted example, the valve body 310 includes a sleeve 312 that engages with the lumen defined by the tube 360. In addition, the valve body 310 includes an annular rib 314 that can engage with the tube 380.

The duckbill member 340 is a flexible elastomeric member. In some embodiments, the duckbill member 340 is made of a material such as, but not limited to, silicone, rubber, nitrile. Buna, EPDM, polyurethane, and the like.

Figure 9:
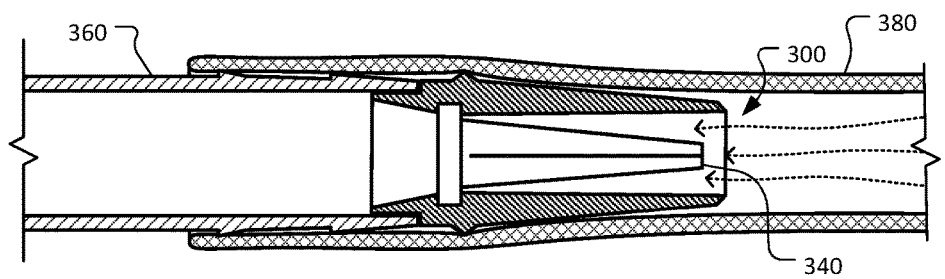
FIG. 9 shows the arrangement of FIG. 8 preventing back-flow.

As depicted in FIG. 9, when the fluid pressure within the tubes 360 and 380 is such that the fluid would tend to flow from the tube 380 to the tube 360, the one-way valve 300 will close to prevent such fluid flow.

Figure 10:
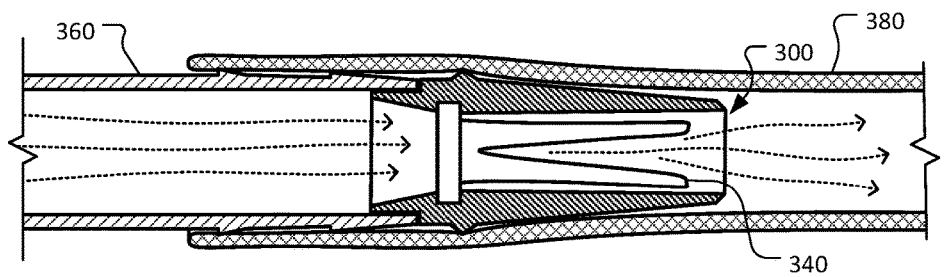
FIG. 10 shows the arrangement of FIG. 8 allowing forward-flow.

As depicted in FIG. 10, when the fluid pressure within the tubes 360 and 380 is such that the fluid would tend to flow from the tube 360 to the tube 380, the one-way valve 300 will open to allow such fluid flow.

In some cases, the one-way valve 300 is a sterile component that is provided in sterile packaging.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described herein as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described herein should not be understood as requiring such separation in all embodiments, and it should be understood that the described program components and systems can generally be integrated together in a single product or packaged into multiple products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A one-way valve device comprising:
a frame, the frame including a base that defines an opening and a seat, the frame also including a plurality of elongate ball containment members that extend from the base, each ball containment member of the plurality of ball containment members having a free end that is opposite of the base, wherein the frame is a unitary, monolithic construct;
a spherical ball, the ball loosely disposed within and contained within a space defined between the plurality of ball containment members and the base, wherein the ball can make contact with the seat to create a fluid seal therebetween; and
an insertion tool,
wherein the one-way valve device is configured to be inserted within the lumen of a tube, wherein the one-way valve device is sterile and contained within packaging that maintains sterility, and wherein the insertion tool is contained within the packaging.

2. The one-way valve device of claim 1, wherein the base includes one or more annular ribs that are configured to engage with an inner wall of the tube.

3. The one-way valve device of claim 1, wherein the frame is a unitary molded thermoplastic component.

4. The one-way valve device of claim 1, wherein the insertion tool comprises a insertion tool base and a plurality of fingers extending from the insertion tool base, wherein free ends of the plurality of fingers are configured for contacting the base of the one-way valve device and for applying a force thereto for inserting the one-way valve device within the tube.

5. The one-way valve device of claim 1, wherein the plurality of elongate ball containment members comprises three elongate ball containment members.

6. The one-way valve device of claim 5, wherein the three elongate ball containment members are oriented at 120 degrees apart from each other around the base.

7. The one-way valve device of claim 1, wherein the ball is free to move within the space along a longitudinal axis of the frame.

8. The one-way valve device of claim 1, wherein the ball is made from polymeric, ceramic, natural, or metallic materials.

9. The one-way valve device of claim 1, wherein the frame comprises a sleeve sized to couple within an end of a barbed tube.

10. A one-way valve device comprising:
a valve body, the valve body defining a lumen longitudinally therethrough, the valve body including a sleeve portion on one end of the valve body, the sleeve portion configured for engaging within a lumen of a first tube, the valve body also comprising an annular rib for engaging with an inner wall of a second tube when the one-way valve device is installed within a lumen of the second tube, and wherein the second tube is configured to be installed over an end portion of the first tube while the one-way valve device is within the lumen of the second tube and the sleeve portion is engaged within the lumen of the first tube; and
a duckbill member at least partially disposed within the lumen of the valve body, wherein the duckbill member is reconfigurable between an open configuration and a closed configuration.

11. The one-way valve device of claim 10, wherein the duckbill member is a flexible elastomer.

12. The one-way valve device of claim 10, wherein the one-way valve device is sterile and contained within packaging that maintains sterility.

13. The one-way valve device of claim 10, wherein the valve body is a unitary molded thermoplastic component.

* * * * *